United States Patent [19]

de Vietro

[11] Patent Number: 4,949,541
[45] Date of Patent: Aug. 21, 1990

[54] APPARATUS FOR THE FEED AND THE SPEED AND TORQUE CONTROL OF A HYDRAULIC MOTOR WITH VARIABLE DISPLACEMENT AT CONSTANT PRESSURE

[75] Inventor: Ivano de Vietro, San Lazzaro Di Savena, Italy

[73] Assignee: Riva Calzoni S.P.A., Milan, Italy

[21] Appl. No.: 160,688

[22] Filed: Feb. 26, 1988

[51] Int. Cl.[5] .................. F16H 61/42; F16H 61/46
[52] U.S. Cl. .............................. 60/413; 60/448; 60/450; 60/452; 60/489
[58] Field of Search ............... 60/455, 450, 459, 448, 60/451, 420, 462, 494, 413, 489, 452

[56] References Cited

U.S. PATENT DOCUMENTS

| 3,296,797 | 1/1967 | Tlusty | 60/450 |
|---|---|---|---|
| 3,866,420 | 2/1975 | Appel | 60/445 |
| 3,965,682 | 6/1976 | Herchenroder | 60/450 X |
| 4,011,721 | 3/1977 | Yip | 60/445 |
| 4,503,674 | 3/1985 | Backe et al. | 60/450 X |
| 4,644,748 | 2/1987 | Goss et al. | 60/494 X |
| 4,644,749 | 2/1987 | Somes | 60/489 X |
| 4,710,106 | 12/1987 | Iwata et al. | 60/459 X |
| 4,712,377 | 12/1987 | Yoshida et al. | 60/493 |
| 4,736,585 | 4/1988 | Kordak | 60/459 |

FOREIGN PATENT DOCUMENTS

| 1811750 | 6/1970 | Fed. Rep. of Germany | 60/450 |
|---|---|---|---|
| 167501 | 10/1982 | Japan | 60/445 |
| 8486 | 1/1985 | Japan | 60/445 |
| 1202673 | 8/1970 | United Kingdom | 60/445 |

Primary Examiner—Robert E. Garrett
Assistant Examiner—George Kapsalas
Attorney, Agent, or Firm—Herbert Dubno

[57] ABSTRACT

The apparatus for the feed and control of the speed and torque of a hydraulic motor having variable swept volume according to this invention comprises a hydraulic feed device for the motor, adapted for supplying the required flow rate of hydraulic fluid under all conditions at the working pressure, a constant pressure hydraulic control circuit associated with the hydraulic device or devices for varying the swept volume fo the motor, adapted for modifying the swept volume itself in relation to the pressure of the hydraulic fluid supplied to the motor, and a flow regulator valve with proportional control, piloted by an electronic regulator generating a control signal for the valve and receiving the signal of a sensor of the rotational speed of the motor and a reference signal.

3 Claims, 2 Drawing Sheets

APPARATUS FOR THE FEED AND THE SPEED AND TORQUE CONTROL OF A HYDRAULIC MOTOR WITH VARIABLE DISPLACEMENT AT CONSTANT PRESSURE

BACKGROUND OF THE INVENTION

1. Field of the Invention

The present invention relates to an apparatus for the feed and control of the speed of a hydraulic motor having variable swept volume, which enables variations in the resisting torque applied to the motor to be met, while the rotational speed is kept constant or is varied in accordance with the desired excursion.

2. Description of the Prior Art

For certain uses of hydraulic motors and, in particular, in the case where such motors are used on injection molding machines for plastics materials, for driving the screw for loading the granular material to be molded, the problem arises of keeping the rotational speed of the motor constant, or of varying it according to a predetermined function, independently of variations in the resisting torque applied which can result from differing behaviors in the devices driven by the motor.

Such control or regulation, moreover, must be carried out in a manner which reduces to a minimum the loss of energy, that is to say without the need to dump the feed when the latter is in excess, but appropriately controlling the behavior of the motor under all conditions.

SUMMARY OF THE INVENTION

These results are achieved by the present invention, which provides an apparatus for feed and control of the speed of a hydraulic motor having variable swept volume, which comprises a hydraulic feed device for the motor adapted to supply the required flow rate of hydraulic fluid under all conditions at the working pressure, a constant pressure hydraulic control circuit associated with the hydraulic device or devices for varying the swept volume of the motor for modifying the swept volume itself in relation to the pressure of the hydraulic fluid supplied to the motor, and a flow regulating valve with proportional control, piloted by an electronic regulator generating a control signal for the valve and receiving the signal of a sensor of the rotational speed of the motor and a reference signal.

The hydraulic feed device for the motor may be composed of a hydraulic pump with constant flow rate, associated with one or more hydropneumatic accumulators connected to the feed line to the motor, the pump being capable of supplying the mean value of flow rate required and the accumulators being capable of providing for temporary larger demands of hydraulic fluid by the motor, or, alternatively, of a pump having a variable swept volume, equipped with a regulator for pressure and delivery flow rate, adapted for keeping the delivery pressure constant and for supplying the flow rate required from time to time.

The constant pressure regulator of the hydraulic device or devices for varying the swept volume of the motor is composed of a pressure reducing valve with fixed setting and of a piloted regulating valve with a line branched from the supply line to the motor, which valves are connected to the respective feed inlets of the device or devices for varying the swept volume of the motor.

BRIEF DESCRIPTION OF THE DRAWING

The above and other objects, features and advantages of my invention will become more readily apparent from the following description, reference being made to the accompanying highly diagrammatic drawing in which.

DETAILED DESCRIPTION OF THE PREFERRED EMBODIMENTS

Figure 1:
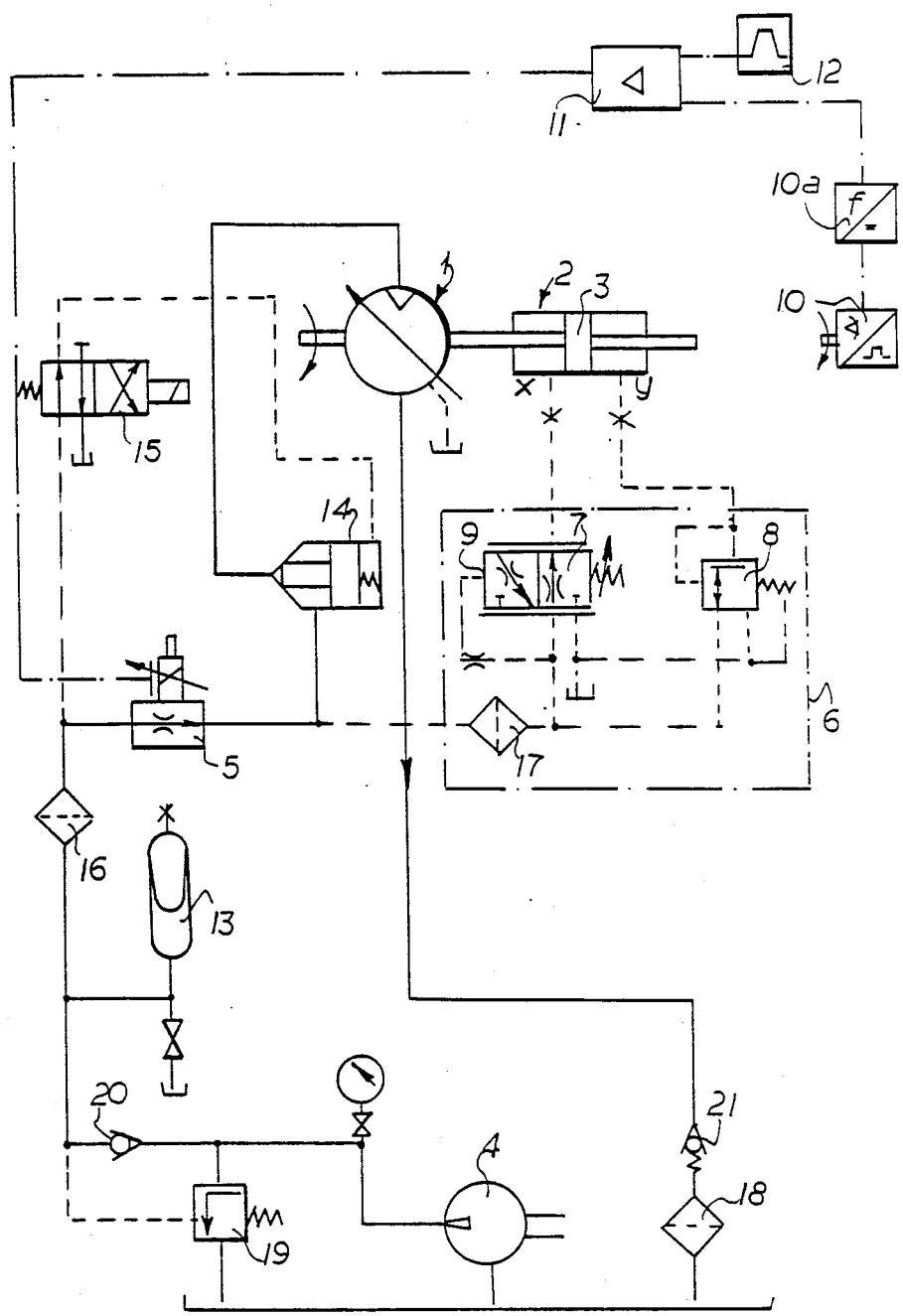
FIG. 1 is a hydraulic diagram of the controller according to this invention, with a constant flow pump and hydropneumatic accumulator.

FIG. 1 has a hydraulic motor 1 whose swept volume is variable by means of a hydraulic device 2, represented schematically. In the arrangement of the drawing, a displacement towards the right of the movable element 3 of the device 2, that is to say a feed at the inlet "x", produces a reduction in the swept volume.

The motor is supplied from a constant delivery rate pump 4, via a flow regulating valve with proportional control 5.

The position of the device 2 for varying the swept volume of the motor is controlled by a constant pressure regulator 6, comprising a regulating valve 7 and a pressure reducing valve 8, which react to variations in the supply pressure to the motor with a corresponding variation in the swept volume of the motor itself, varying in this manner the torque supplied by the motor and adjusting it to the demand of the external devices driven by it.

In feed pressure conditions lower than the value provided by the setting of the valve 7, the motor operates with the swept volume at a minimum; this comprises the maximum rotational speed of the motor and the minimum torque delivered.

If the feed pressure increases, the valve 7, piloted at its inlet 9, displaces progressively, bringing the motor 1 towards higher values of swept volume, thereby increasing the torque and reducing the speed, until equilibrium is reached with the feed pressure, as a function of the resistant torque applied to the motor.

The rotational speed of the motor is monitored by a sensor 10 of the rotational speed of the motor shaft, the signal from which is of the electrical type and is supplied to an electronic regulator 11, where it is compared with a reference value 12, constituted of a suitable electrical signal.

Usually, the electrical signal generated by the sensor 10 is a variable frequency signal and advantageously it is converted into a signal of variable current or variable voltage, by means of a frequency-current converter or frequency-voltage convertor 10a, enabling it to be compared with a signal 12 of the same type emitted by an appropriate function generator.

The command produced by the controller 11 actuates the proportional-control flow regulating valve 5, by means of which the feed flow rate to the motor is modulated, until the desired value of speed is reached.

In order to satisfy temporary, high demands for flow, greater than the delivery rate of the pump 4, one or more hydropneumatic accumulators 13 are provided, adapted for supplying for short periods the excess of fluid under pressure required by the valve 5, without the pump 4 having to have overdimensions for such conditions.

The obturator 14, piloted by a controllable valve 15, enables starting and stopping of the motor to be controlled, and there are also provided filters 16, 17, 18, a dump valve 19 and non-return valves 20, 21, the functions of which are known and which are therefore not described in detail.

Figure 2:
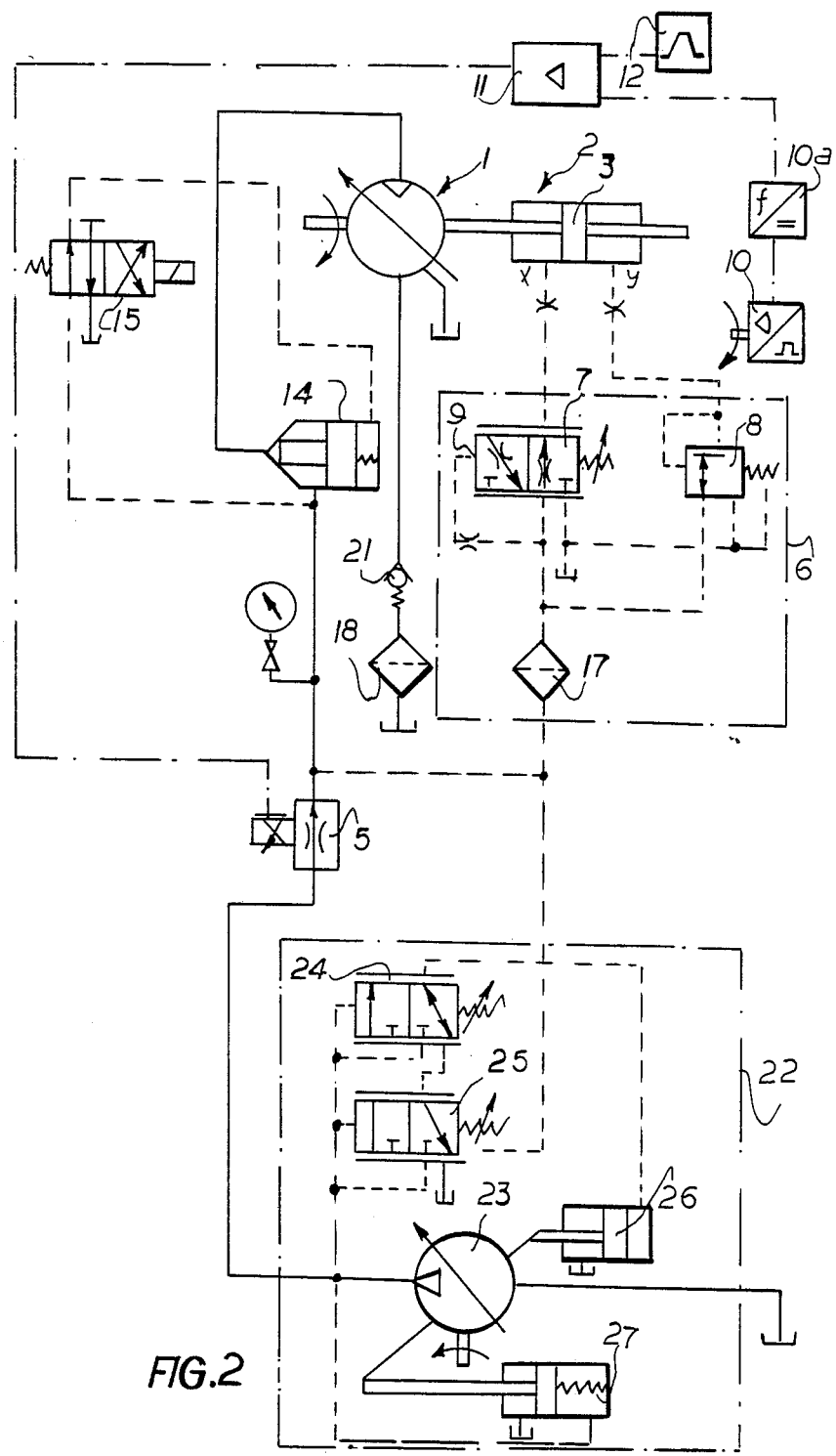
FIG. 2 is a hydraulic diagram of the controller according to this invention, with a pump of variable delivery rate.

In the case where it is not appropriate to use hydropneumatic accumulators 13, a pump of variable delivery rate may be used, as illustrated in FIG. 2, in which like components have been given the same reference numerals as in FIG. 1.

In this embodiment, there is a hydraulic supply group 22, which comprises a variable-delivery pump 23, equipped with associated valves 24, 25 for controlling the delivery flow rate and pressure, and associated devices 26, 27 for regulating the swept volume, themselves of known type, controlled by the valves 24, 25. In this case, therefore, in the absence of hydropneumatic accumulators, the pump 23 must be designed to supply the maximum flow rate demanded by the motor; when this maximum flow rate is not required, the pump operates in conditions of reduced flow rate, thereby avoiding wastage of energy.

The control apparatus according to this invention therefore enables the conditions of rotational speed and torque necessary to be provided in every case, with the motor of variable swept volume, either by keeping said speed constant while varying the torque supplied, in response to the demands of the driven devices, or by following predetermined curves of speed variation in relation to the demand, such as, for example, for achieving a particular start-up or stopping ramp.

This control may be carried out simply, by varying the reference signal 12 supplied to the regulator, which determines the position of the valve 5 on the basis of the rotational speed of the motor, because the flow rate determined by it and the torque required by the driven devices act in an autonomous manner, via the constant pressure regulator 6, upon the swept volume of the motor, adjusting it in all conditions to the required value, without the necessity for measuring the value of the effective swept volume in use at every instant in the motor itself.

Numerous variants may be introduced, without thereby departing from the scope of the invention in its general characteristics.

I claim:

1. An apparatus for controlling the speed and torque of a hydraulic motor having variable swept volume comprising:
   hydraulic feed means dimensioned to supplying a hydraulic fluid under constant pressure and at a flow rate sufficient to satisfy all hydraulic requirements of said motor;
   a speed control circuit including:
      means for generating an electrical reference signal,
      sensing means responsive to a speed of the motor for detecting an actual value of the speed of the motor in response to a change of a load on said motor and generating an electrical signal representing said actual value,
      comparator means for comparing said reference signal and said actual value, and
   an electrically controlled flow regulating valve receiving a comparison signal from said comparator means and connected in series between said hydraulic feed means and said motor, said flow regulating valve varying flow of the hydraulic fluid between said hydraulic feed means and said motor for maintaining a predetermined rotational speed of the motor regardless of said change of the load, said flow regulating valve being formed with an outlet port connected to a feed inlet of said motor; and
   a hydraulic constant-pressure control circuit operatively connected with said outlet port of said valve, said constant-pressure control circuit including:
   means for varying a swept volume of the motor in response to the change of a pressure of said fluid at said outlet port and applied to said feed inlet of said motor until an equilibrium is reached between said pressure of said fluid at said outlet and a torque developed by said motor, said means for varying the swept volume of the motor including a pressure-reducing valve with a fixed threshold and a regulating valve connected with said outlet port of said flow regulating valve.

2. The apparatus defined in claim 1 wherein said hydraulic feed means is a hydraulic pump with a fixed delivery rate operatively connected with at least one hydropneumatic accumulator.

3. The apparatus defined in claim 1 wherein said hydraulic feed means includes a variable displacement hydraulic pump with a variable volume under compression; and means for regulating a displacement of said pump.

* * * * *